United States Patent [19]

Kolycheck et al.

[11] Patent Number: 4,643,949

[45] Date of Patent: Feb. 17, 1987

[54] MAGNETIC RECORDING TAPE

[75] Inventors: Edmond G. Kolycheck, Lorain; Lawrence Ondercin, Brook Park, both of Ohio

[73] Assignee: The BF Goodrich Company, Akron, Ohio

[21] Appl. No.: 483,399

[22] Filed: Apr. 8, 1983

[51] Int. Cl.$^4$ ............................................... G11B 5/70
[52] U.S. Cl. .......................... 428/425.9; 252/62.54; 427/128; 360/134; 360/135; 360/136; 428/694; 428/900
[58] Field of Search ............ 428/425.9, 694, 900; 252/62.54; 427/128, 131; 360/134–136

[56] References Cited

U.S. PATENT DOCUMENTS 4,131,731  12/1978  Lai .......................................... 528/85
4,328,282  4/1982  Lehner ................................ 428/694

Primary Examiner—Ellis P. Robinson
Attorney, Agent, or Firm—G. A. Kap; A. A. Csontos

[57] ABSTRACT

Magnetic recording tape comprising a flexible substrate with magnetic particles secured to the substrate by means of a binder comprising a reaction product of a diisocyanate with a blend of a chain extender and a hydroxyl terminated polycarbonate, said binder having high tensile strength, is hydrolytically stable, and is soluble in selected commercial solvents.

5 Claims, No Drawings

MAGNETIC RECORDING TAPE

BACKGROUND OF THE INVENTION

Polyester-based and polyether-based polyurethane binders for magnetic recording tape are well known commercial products. Polyester-based polyurethane binders are known to possess high tensile strength and solubility in selected solvents but lack the desired hydrolysis resistance. Polyether-based polyurethane binders, on the other hand, have the reputation of possessing hydrolysis resistance but do not exhibit comparable tape properties as the polyester polyurethane binders.

The invention disclosed herein relates to magnetic recording tape, and generally to magnetic recording media, coated with a polycarbonate-based polyurethane binder which has high tensile strength, is soluble in selected solvents, is hydrolytically stable, and provides the desirable tape properties.

SUMMARY OF THE INVENTION

This invention relates to a magnetic medium, especially magnetic tape, comprising a backing member and at least one coating on the backing member comprising fine magnetic particles and a binder securing the magnetic particles to the backing member, the binder comprising a reaction product of a diisocyanate with a blend of a chain extender, such as 1,4-butanediol, and a hydroxyl terminated polycarbonate.

DETAILED DESCRIPTION OF THE INVENTION

Pursuant to the invention described herein, a polycarbonate-based thermoplastic polyurethane resin is used as a binder to adhere fine magnetic particles to a substrate in the production of a magnetic medium, such as magnetic tape suitable for use in audio, video, and computer applications. Such magnetic tapes have hydrolytic stability in addition to the other physical properties desired of such a binder.

The polycarbonate-based polyurethane resin of this invention is prepared by reacting a diisocyanate with a blend of a hydroxyl terminated polycarbonate and a chain extender. The hydroxyl terminated polycarbonate can be prepared by reacting a glycol with a carbonate.

U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecule with each alkoxy group containing 2 to 4 carbon atoms. Diols suitable for use in the present invention include aliphatic diols containing 4 to 12 carbon atoms such as butanediol-1,4, pentanediol-1,5, neopentyl glycol, hexanediol-1,6, heptanediol-1,7, octanediol-1,8, 2-ethylhexanediol-1,6, 2,2,4-trimethylhexanediol-1,6, decanediol-1,10 hydrogenated dilinoleylglycol, hydrogenated dioleylglycol and cycloaliphatic diols such as cyclohexanediol-1,3, dimethylolcyclohexane-1,4, cyclohexanediol-1,4, dimethylolcyclohexane-1,3, 1,4-endomethylene-2-hydroxy-5-hydroxymethyl cyclohexane, and polyalkylene glycols. The diols used in the reaction may be a single diol or a mixture of diols depending on the properties desired in the finished product.

Suitable carbonates are selected from alkylene carbonates composed of a 5 to 7 membered ring having the following general formula:

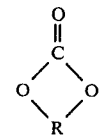

where R is a saturated divalent radical containing 2 to 6 linear carbon atoms. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° to 300° C. and at a pressure in the range of 0.1 to 300 mm of mercury in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° to 300° preferably at 150° to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° to 300° C., preferably 150° to 250° C. and at a pressure of 0.1 to 10 mm Hg until the desired molecular weight of the hydroxyl terminated polycarbonate is attained. Molecular weight of the hydroxyl terminated polycarbonates can vary from about 500 to about 10,000 but in a preferred embodiment, it will be in the range of 500 to 2500.

The hydroxyl terminated polycarbonates are available commercially. Poly(hexamethylene carbonate)-glycol with an OH number range of 50-60, for instance, is a linear polymer that has the following physical properties:

| | |
|---|---|
| Solids Content | 100% |
| Melt Temperature | 40-50° C. |
| Nominal OH | 55 |
| OH Range | 50-60 |
| Color | 0-1 Gardner Scale |
| Acid Number | 0.2 |
| Viscosity @ RT | solid |
| @ 60° C. | 3,000-8,000 cps |
| Functionality | 2.0 |
| Moisture | 0.1% max. |

The hydroxyl terminated polycarbonates described above are blended with a chain extender before the blend is reacted with a diisocyanate. Amount of chain extender can vary from 0.1 to 10 mols per mol of the polycarbonate, preferably from 0.5 to 5 mols. The chain extender may be any glycol, or combinations of glycols, containing two or more hydroxyl groups and 2 to 10 carbon atoms, such as ethylene glycol, propylene glycol, 1,4-butanediol, 1,3-butanediol, 1,5-pentanediol, 1,6-hexanediol, 1,4-cyclohexanedimethanol, hydroquinone di(hydroxyethyl)ether, or any aliphatic or aromatic molecule containing two or more reactive hydroxyl groups. The preferred chain extender is 1,4-butanediol.

The preferred diisocyanate is methylene bis diphenyl diisocyanate, also known as diphenyl methane-p,p'-diisocyanate, hereinafter referred to as MDI. Other operable diisocyanates are the aliphatic diisocyanates containing 2 to 12 carbon atoms, such as tetramethylene diisocyanate, hexamethylene diisocyanate and the like; the cycloaliphatic diisocyanates, such as cyclohexyl diisocyanate and the like; the aromatic diisocyanates containing 6 to 18 carbon atoms in the ring(s), such as the phenyl diisocyanates, the toluene diisocyanates and the like; the dicycloaliphatic diisocyanates containing 8 to 16 carbon atoms in the rings, such as cyclohexyl methane diisocyanate and the like; and the diaryl diisocyanates, such as MDI, dichloro-diphenyl methane diisocyanate, dimethyl diphenyl methane diisocyanate, diphenyl dimethyl methane diisocyanate, dibenzyl diisocyanate, diphenyl ether diisocyanate and the like. The amount of diisocyanate used to react with the hydroxy terminated polycarbonate and chain extender depends on the quantity of polycarbonate and free glycol, if any, present in the composition. The number of mols of diisocyanate will be substantially equal to the sum total of the number of mols of polycarbonate and chain extender(free glycol). The result is that the polyurethane resin formed is essentially free of NCO (isocyanate) groups, although, generally, mols of diisocyanate per mol of the hydroxyl terminated polycarbonate and chain extender can vary from 0.95 to 1.01.

The polycarbonate-based polyurethane resin is only one component in a binder formulation. A typical formulation can include the following:

| Material | % Non-Volatiles |
|---|---|
| Magnetic Particles | 75-85 |
| Binder Resin | 10-15 |

-continued

| Material | % Non-Volatiles |
|---|---|
| Wetting Agent | 1-5 |
| Lubricant | 1-5 |
| Crosslinking Agent | 1-5 |
| Other Additives | 1-5 |

The magnetic particles suitable for use herein include iron (Fe) particles which have a high permanent magnetization but are difficult to handle and disperse; iron oxide ($Fe_2O_3$) particles which are most commonly used and are characterized by acicular, needle-shaped forms; cobalt-oxide/iron oxide ($CoOFe_2O_3$) particles which have high coercivity and improved switching field response; and chromium oxide ($CrO_2$) particles which have a high magnetic moment resulting from a more uniform crystal alignment.

Binder modifiers can be used in the usual amounts and examples thereof are cobinders, crosslinking agents, and catalysts. Examples of cobinders include phenoxy, epoxy, vinyl chloride/vinyl acetate, and polyester resins. Crosslinking agents include the multifunctional isocyanates and the agents to facilitate electron beam curing. A catalyst such as ferric acetyl acetonate can be used to expedite the crosslinking reaction involving the multifunctional isocyanates and the reactants in the magnetic slurry.

Suitable wetting agents cover a gamut of materials. Specific examples thereof include soya lecithin, zinc naphthanate, polyesters such as synthetic sperm oils, mono to tri esters of oleic acid, triethanolamine, lignin sulfonic acid, and dioctyl sodium sulfosuccinate.

Lubricants can be added to the formulation or topically to the tape. Examples thereof include silicones such as fluorinated hydrocarbon oils, long chain fatty acids and stearates of calcium, lithium, and magnesium.

The magnetic tape disclosed herein comprises a flexible substrate, a coating of magnetic particles on the substrate, and a binder for adhering the magnetic particles to the substrate. The substrate typically used is polyethylene terephthalate, of a suitable thickness, although other flexible plastic film substrates can also be used. The tape can be made by admixing magnetic particles with a solvent solution of the binder and the designated additives to make a magnetic dispersion, coating this magnetic dispersion with the binder onto a flexible substrate, and removing the solvent therefrom to form an adherent coating of magnetic particles on the substrate. Suitable solvents for preparing the magnetic dispersion containing the binder include tetrahydrofuran, methylethylketone, cyclohexanone, and certain mixtures of these solvents.

For a more thorough understanding of the present invention, reference is now made to the following specific examples illustrating the preparation of the polycarbonate-based thermoplastic polyurethane resins which are used as binders in making magnetic recording tape.

EXAMPLE 1

One mole of poly(hexamethylene carbonate)glycol, i.e., the hydroxyl terminated polycarbonate with a molecular weight of 2000, was blended at 60° C. with 2.41 mols (216.9 grams) of 1,4-butanediol chain extender. The hydroxyl terminated polycarbonate was prepared pursuant to the procedure outlined in Ex. 1 of U.S. Pat. No. 4,131,731. This blend or physical mixture was then reacted with 3.41 mols (852.5 g) of methylene bis diphenyl diisocyanate (MDI) by the standard high temperature random melt polymerization procedure. This procedure involved heating the polycarbonate and MDI separately to about 100° C. and then mixing the ingredients. The reaction is exothermic and raises temperature to about 200°–250° C. in about 1 to 5 minutes, during which time polymerization takes place as evidenced by an increase in viscosity.

EXAMPLE 2

One mol of poly(hexamethylene carbonate)glycol with a molecular weight of 2000 was blended at 60° C. with 1.69 mols of 1,4-butanediol and 0.72 mols of 1,3-butanediol. The stannous octoate catalyst was then added to the blend at a concentration of 100 weight parts per one million parts of the blend and the blend was then reacted with 3.41 mols of MDI by the standard high temperature random melt polymerization procedure.

EXAMPLE 3

One mol of poly(hexamethylene carbonate) glycol with a molecular of 900 was blended at 60° C. with 0.85 mol of 1,4-butanediol. This blend was then reacted with 1.85 mols of MDI by the standard high temperature random melt polymerization procedure.

For comparison purposes, physical properties of the thermoplastic polyurethanes prepared in Examples 3 and 2 are given in Table I, below, as well as physical properties of typical polyester and polyether type of thermoplastic polyurethanes.

of at least one diol and at least one carbonate in the molar ratio of 10:1 to 1:10, said diol contains 4 to 12 carbon atoms and said carbonate is selected from alkylene carbonates containing 2 to 6 linear carbon atoms, dialkyl carbonates of 2 to 5 carbon atoms per each alkyl group, diaryl carbonates containing 6 to 20 carbon atoms in each aryl group, and cycloaliphatic carbonates containing 4 to 7 carbon atoms in each cycloaliphatic group.

3. Recording medium of claim 2 wherein said hydroxyl terminated polycarbonate has molecular weight of 500 to 10,000; said diol is selected from alkylene diols; said carbonate is selected from alkylene carbonates having the following formula:

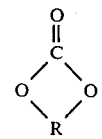

where the R group contains 2 to 6 linear carbon atoms; said chain extender is selected from glycols containing two or more hydroxyl groups and 2 to 10 carbon atoms; and said diisocyanate is selected from aliphatic diisocyanates, cycloaliphatic diisocyanates, and aromatic diisocyanates.

4. Recording medium of claim 3 wherein molar ratio of said diol to said carbonate is 3:1 to 1:3, molecular weight of said hydroxyl terminated polycarbonate is 500 to 2500, and the ratio of said chain extender being 0.1 to 10 mols per mol of said hydroxyl terminated

TABLE 1

| | Example 3 | Example 2 | Typical Polyester | Typical Polyether |
|---|---|---|---|---|
| Backbone | poly(hexamethylene carbonate) glycol | poly(hexamethylene carbonate) glycol | poly(tetramethylene adipate) glycol | poly(tetramethylene ether) glycol |
| Backbone MW | 900 | 2000 | 1000 | 1000 |
| Chain Extender | 1,4-butanediol | 1,3 & 1,4-butanediol | 1,4-butanediol | 1,4-butanediol |
| Blend MW | 500 | 650 | 555 | 555 |
| Diisocyanate | MDI | MDI | MDI | MDI |
| Original | | | | |
| Ultimate Tensile, psi | 5000 | 3850 | 6900 | 6050 |
| Ultimate Elong. % | 350 | 500 | 460 | 550 |
| 100% Modulus, psi | 1100 | 775 | 900 | 730 |
| 300% Modulus, psi | 3500 | 1650 | 2000 | 1200 |
| Shore Hardn., A/D | 85/45 | 78/33 | 87/39 | 83/35 |
| Wks in 70° C. distilled H$_2$O | 24 | 20 | 4 | 24 |
| Ultimate Tensile, psi | 4300 | 3075 | 700 | 4600 |
| Ultimate Elong. % | 420 | 500 | 280 | 630 |
| 100% Modulus, psi | 1100 | 650 | 650 | 750 |
| 300% Modulus, psi | 2600 | 1400 | 700 | 1300 |
| Shore Hardn., A/D | 84/42 | 75/30 | — | 75/— |

We claim:

1. A magnetic recording medium having high tensile strength and improved hydrolytic stability comprising a substrate, magnetic particles, and a binder bonding said magnetic particles to said substrate, said binder consisting essentially of a reaction product of a diisocyanate and a blend of a hydroxyl terminated polycarbonate and a chain extender.

2. Recording medium of claim 1 wherein said hydroxyl terminated polycarbonate is a reaction product polycarbonate.

5. Recording medium of claim 4 wherein said recording medium is a magnetic recording tape, said substrate is a flexible film, said diisocyanate is methylene bis diphenyl diisocyanate, said hydroxyl terminated polycarbonate is poly(hexamethylene carbonate)glycol, and said chain extender is 1,4-butanediol.

* * * * *

REEXAMINATION CERTIFICATE (2011th)

United States Patent [19]
Kolycheck et al.

[11] B1 4,643,949
[45] Certificate Issued May 18, 1993

[54] MAGNETIC RECORDING TAPE

[75] Inventors: Edmond G. Kolycheck, Lorain; Lawrence Ondercin, Brook Park, both of Ohio

[73] Assignee: The B. F. Goodrich Company, New York, N.Y.

Reexamination Request:
No. 90/002,253, Jan. 15, 1991

Reexamination Certificate for:
Patent No.: 4,643,949
Issued: Feb. 17, 1987
Appl. No.: 483,399
Filed: Apr. 8, 1983

[51] Int. Cl.$^5$ ................................. G11B 5/00
[52] U.S. Cl. ..................... 428/425.9; 428/694; 428/900; 252/62.54; 427/128; 360/134; 360/135; 360/136
[58] Field of Search ............ 428/425.9, 694, 900; 252/62.54; 427/128, 131; 360/134, 135, 136

[56] References Cited

U.S. PATENT DOCUMENTS

| | | | |
|---|---|---|---|
| 3,110,686 | 11/1963 | Newton | 260/2.5 |
| 3,187,065 | 6/1965 | McPherson et al. | 260/857 |
| 3,301,825 | 1/1967 | Hostettler et al. | 260/77.5 |
| 3,359,242 | 12/1967 | Seeliger et al. | 260/77.5 |
| 3,544,524 | 12/1970 | Muller et al. | 260/77.5 |
| 3,929,659 | 12/1975 | Graham | 252/62.54 |
| 4,024,113 | 5/1977 | Ammons | 260/77.5 AM |
| 4,116,741 | 9/1978 | Thoma et al. | 156/239 |
| 4,284,750 | 8/1981 | Amirsakis | 528/79 |
| 4,286,022 | 8/1981 | Vermillion et al. | 428/423.1 |
| 4,320,171 | 3/1982 | Motz et al. | 428/423.1 |
| 4,357,391 | 11/1982 | Hosaka et al. | 428/413 |
| 4,363,850 | 12/1982 | Yasui et al. | 428/329 |
| 4,400,498 | 8/1983 | Konishi et al. | 528/60 |
| 4,412,022 | 10/1983 | Hirai et al. | 524/104 |
| 4,695,513 | 9/1987 | Hashimoto et al. | 428/425.9 |

FOREIGN PATENT DOCUMENTS

| | | |
|---|---|---|
| 0002241 | 11/1978 | European Pat. Off. |
| 1035375 | 7/1958 | Fed. Rep. of Germany |
| 3227161 | 1/1984 | Fed. Rep. of Germany |
| 38693 | 3/1980 | Japan |
| 127616 | 10/1981 | Japan |
| 135431 | 8/1982 | Japan |
| 58-60430 | 4/1983 | Japan |
| 1149815 | 4/1969 | United Kingdom |
| 1179222 | 1/1970 | United Kingdom |
| 1375295 | 11/1974 | United Kingdom |

OTHER PUBLICATIONS

Muller, "Aufbau von Urethanelastomeren hoher Hydrolysebestandigkeit," Die Angewandte Makromolekulare Chemie, 16/17 (1971), pp. 117–128.

Muller, "Aufbau von Urethanelastomeren hoher Hydrolysebestandigkeit," Die Angewandte Makromolekulare Chemie, 14 (1970), pp. 75–86 (translation included).

*Primary Examiner*—Paul J. Thibodeau

[57] ABSTRACT

Magnetic recording tape comprising a flexible substrate with magnetic particles secured to the substrate by means of a binder comprising a reaction product of a diisocyanate with a blend of a chain extender and a hydroxyl terminated polycarbonate, said binder having high tensile strength, is hydrolytically stable, and is soluble in selected commercial solvents.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-5 having been finally determined to be unpatentable, are cancelled.

* * * * *